United States Patent
Emmerling et al.

(10) Patent No.: US 6,867,686 B1
(45) Date of Patent: Mar. 15, 2005

(54) FUNCTIONAL MONITORING SYSTEM, IN PARTICULAR ACCESS CONTROL SYSTEM, AND METHOD FOR FUNCTIONAL CONTROL

(75) Inventors: Ulrich Emmerling, Kelheim (DE); Peter Gold, Sinzing (DE)

(73) Assignee: Siemens Aktiengesellschaft, Munich (DE)

( * ) Notice: Subject to any disclaimer, the term of this patent is extended or adjusted under 35 U.S.C. 154(b) by 318 days.

(21) Appl. No.: 09/592,224

(22) Filed: Jun. 12, 2000

(30) Foreign Application Priority Data

Jun. 11, 1999 (DE) .......................... 199 26 748

(51) Int. Cl.[7] .................. H04Q 5/22; H04Q 1/00; G05B 1/00
(52) U.S. Cl. .............. 340/10.2; 340/5.2; 340/5.61; 340/5.72; 340/10.2
(58) Field of Search .................... 340/10.2, 5.22, 340/5.61, 572.1, 572.2, 572.4, 5.72, 10.1, 10.4, 10.41, 5.7, 5.62, 5.63, 5.64, 5.65, 5.66, 5.67

(56) References Cited

U.S. PATENT DOCUMENTS

| | | | | |
|---|---|---|---|---|
| 5,339,073 A | * | 8/1994 | Dodd et al. | 340/5.61 |
| 5,347,280 A | * | 9/1994 | Schuermann | 342/42 |
| 5,450,492 A | * | 9/1995 | Hook et al. | 380/28 |
| 5,530,437 A | * | 6/1996 | Goldberg | 340/10.2 |
| 5,552,641 A | | 9/1996 | Fischer et al. | |
| 5,552,789 A | * | 9/1996 | Schuermann | 340/5.21 |
| 5,561,420 A | * | 10/1996 | Kleefeldt et al. | 340/5.26 |
| 5,648,765 A | * | 7/1997 | Cresap et al. | 340/10.2 |
| 5,844,517 A | * | 12/1998 | Lambropoulos | 340/10.2 |
| 5,929,779 A | * | 7/1999 | MacLellan et al. | 340/10.2 |
| 5,952,922 A | * | 9/1999 | Shober | 340/572.4 |
| 6,020,827 A | | 2/2000 | Konrad et al. | |
| 6,249,212 B1 | * | 6/2001 | Beigel et al. | 340/10.34 |
| 6,396,390 B1 | * | 5/2002 | Achhammer et al. | 340/10.33 |

FOREIGN PATENT DOCUMENTS

EP        0 440 974 B1    8/1991

\* cited by examiner

*Primary Examiner*—Brian Zimmerman
*Assistant Examiner*—Clara Yang
(74) *Attorney, Agent, or Firm*—Laurence A. Greenberg; Werner H. Stemer; Ralph E. Locher

(57) ABSTRACT

The transmitting and receiving station generates a interrogation code signal which is identical for all of the transponders. All of the transponders that receive the signal answer simultaneously at the same carrier frequency. In order to avoid signal collisions, the transponders are synchronized before and/or during the transmission of the response signals. As an alternative, each transponder is assigned a dedicated subcarrier frequency in addition to the main carrier frequency, which is the same for all of the transponders.

8 Claims, 1 Drawing Sheet

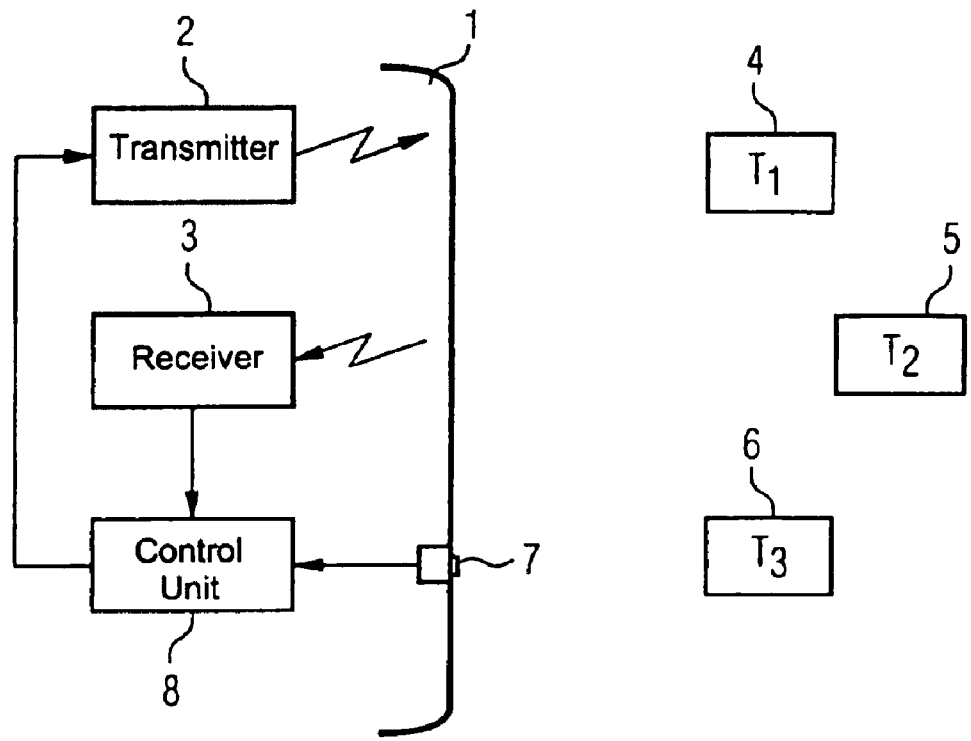
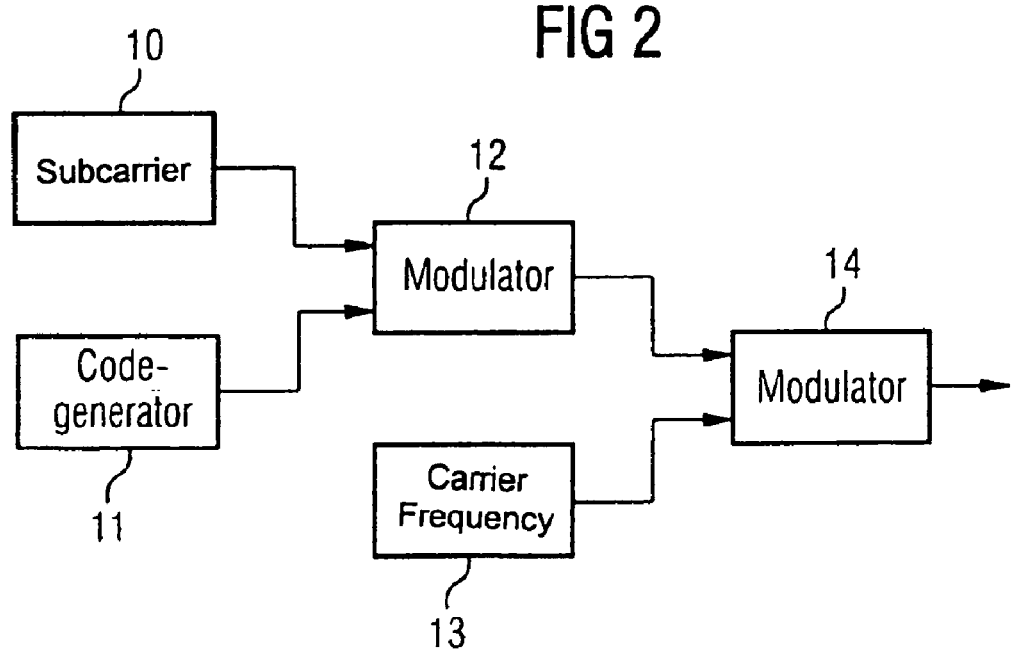

FUNCTIONAL MONITORING SYSTEM, IN PARTICULAR ACCESS CONTROL SYSTEM, AND METHOD FOR FUNCTIONAL CONTROL

BACKGROUND OF THE INVENTION

Field of the Invention

The invention relates to a functional monitoring system, in particular access control system, having a central transmitting and receiving station and a plurality of transponders which can communicate bidirectionally with the transmitting and receiving station.

European patent EP 0 440 974 B1 and U.S. Pat. No. 5,552,641 disclose such functional monitoring systems in the form of motor vehicle access control systems. There, a central transmitting and receiving station arranged in or on the motor vehicle transmits an interrogation code signal (question code) for example after the actuation of a door actuating button. The signal is answered by a portable transponder located in radio range. The motor vehicle access control system described in U.S. Pat. No. 5,552,641 may be configured with multichannel capability for security reasons.

If, for such an access control system, a plurality of portable transponders are issued for use by a number of persons, the functional monitoring system, in the case of desired functional control, should not only be able to identify whether one or more transponders are located in the detection range of the central transmitting and receiving station, but also be able to detect which transponder or transponders is or are involved. This is true particularly if the individual transponders are assigned different functional scopes (by way of example, one transponder may be allowed only to unlock the central locking system, while another transponder may, in addition to actuating the central locking system, also if disconnect the immobilizer device and thus enable the motor vehicle for a driving mode).

The functional monitoring system must therefore check whether, and which, transponders are located in the detection range. At the same time, it must be ensured that a plurality of authorized transponders do not mutually influence one another during the transmission of their response code signals (answer code), such that the system can no longer check the correctness of the response code signals and hence the desired function is also not enabled. The communication thus needs to be safeguarded against collisions. One possible approach for solving this problem consists in allocating different identifiers, e.g. numbers, to the transponders and directing the transponder search in each case only at one transponder, that is to say transmitting a dedicated interrogation code signal for each transponder (e.g. with an address which designates only this one transponder). The transponders belonging to a system are then successively interrogated as to their presence by multiple repetition of the transmission of the interrogation code signal, which is progressively altered in each case, and waiting for an response code signal. However, this procedure takes up an appreciable amount of time, with the result that an undesirable time delay may possibly occur between a user requesting a specific function and the function that is actually being carried out.

SUMMARY OF THE INVENTION

The object of the invention is to provide a functional monitoring system which overcomes the above-noted deficiencies and disadvantages of the prior art devices and methods of this kind, and which is distinguished by rapid response in the event of desired triggering of the function to be controlled.

With the above and other objects in view there is provided, in accordance with the invention, a function monitoring system, comprising:
  a transmitting and receiving station configured to transmit an interrogation code signal at regular intervals, at irregular intervals, and/or as a reaction to a triggering event; and
  a plurality of transponders each configured to respond to the interrogation code signal upon receiving the interrogation code signal and to generate a response signal and transmit the response signal to the transmitting and receiving station.

In other words, the system according to the invention is configured such that the central transmitting and receiving station transmits only a single search signal to all of the transponders belonging to the system and all of the transponders which are located in the reception range answer simultaneously. As a result, not only is the search operation distinctly reduced in respect of the time and power requirement, but the desired function can also be carried out immediately even if just a single authorized transponder reports. The interrogation code signal is thus identical for all of the transponders.

In accordance with an additional feature of the invention, each of the transponders includes a synchronization device effecting a synchronization of a transponder operation with the interrogation code signal received by the transponder or a code signal sequence transmitted with the interrogation code signal, such that the response signals of the transponders are transmitted in synchronicity.

In other words, when the interrogation code signal (search signal or search telegram) is received, the transponders are synchronized with the bit sequence of the signal and then simultaneously start to transmit their answer, for example after a time interval which is the same for all of the transponders and suffices for synchronization purposes has elapsed starting from the reception of the interrogation code signal. This ensures that all of the transponders transmit exactly with the same timing rhythm, so that, at the reception end, no signal collision occurs, rather there is merely an increase in the received field strength in an advantageous manner. In this case, all of the transponders transmit the same answer signal with the same frequency and baud rate.

As an alternative or in addition, each transponder may be equipped with a dedicated subcarrier frequency generator which generates a subcarrier frequency which differs from the subcarrier frequencies of at least some, preferably all, of the other transponders and serves for modulation of the carrier frequency signal, which is the same for all of the transponders, in which case the subcarrier frequency is preferably modulated beforehand with a code sequence (e.g. identifier information or information about an additional function to be controlled) assigned to the respective transponder. The baud rate is likewise the same for all of the transponders. After the search signal, all of the transponders in the detection range answer with the same carrier frequency and baud rate but with their additional, dedicated frequency component (intermediate frequency) caused by the subcarrier. It is not necessary to synchronize the various transponders in this case. The receiving station thus receives all of the answer signals essentially simultaneously immediately after the transmission of the search signal and can divide the answer signals between different channels, for example by means of suitable filters, and evaluate them separately and thus identify essentially in parallel which transponders are present in the detection range. The modulation of the subcarrier frequency signal and/or the modulation of the (main) carrier frequency signal may preferably be effected by means of amplitude modulation or frequency modulation or by means of another suitable modulation method. At the same time, selective information transmission and/or transponder identification is possible by virtue of the double modulation method.

In accordance with a preferred feature of the invention, the transmitting and receiving station forms a part of an access control system, such as a motor vehicle access control system.

With the above and other objects in view there is also provided, in accordance with the invention, a method of operating a functional monitoring system having a transmitting and receiving station and a plurality of transponders, the method which comprises:

transmitting an interrogation code signal with a transmitting and receiving station; and simultaneously responding with each of a plurality of transponders receiving the interrogation-code signal by transmitting a response signal.

The interrogation code signal is thereby transmitted at regular time intervals, irregular time intervals, or in reaction to a triggering event.

In accordance with a further feature of the invention, the transponders are synchronized for transmitting the response signal, i.e., before and/or during the response transmission.

In accordance with again a further feature of the invention, the respective response signals are generated by double modulation with an initial modulation of a subcarrier frequency signal with an response code signal and a subsequent modulation of a carrier frequency signal, common to all of the transponders, with the modulation output signal obtained in the initial modulation.

In accordance with a concomitant feature of the invention, the transmitting and receiving station evaluates the frequency components caused by the subcarrier frequency signals of the individual transponders in different channels.

Consequently, in the case of the invention, by means of a single interrogation code signal, all of the transponders are addressed and required to react simultaneously, with the result that the successive searching for a single transponder in each case is obviated and the system reaction time is shortened to the minimum possible time. This is important particularly in the case of keyless access control systems, but also in the case of other functional monitoring systems. In this case, it is ensured at the same time that the communication is free from collisions, in particular by virtue of synchronization and/or the use of different answer frequency components for the same carrier frequency and baud rate.

Other features which are considered as characteristic for the invention are set forth in the appended claims.

Although the invention is illustrated and described herein as embodied in a functional monitoring system, in particular access control system, and method for functional control, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic block diagram of the system according to the invention; and FIG. 2 is a block diagram of part of the internal transponder structure.

DESCRIPTION OF THE PREFERRED EMBODIMENTS

Referring now to the figures of the drawing in detail and first, particularly, to FIG. 1 thereof, there is seen an exemplary embodiment of the invention, wherein the functional monitoring system is designed as a motor vehicle access control system. The system includes a transmitting and receiving station which is fitted in or on a schematically illustrated motor vehicle 1 and comprises at least one transmitter 2 and at least one receiver 3. The transmitter 2 and the receiver 3 operate inductively and/or in the radio frequency range and can be combined to form a single unit assembly. Furthermore, there are a plurality of transponders 4, 5, 6, which may be designed for example as key ring pendants or smart cards. Each transponder is equipped with an inductive receiving unit and a radio frequency transmitting unit.

In order to unlock the motor vehicle, it is necessary to actuate, for example, a pushbutton 7, a door handle or another component on the motor vehicle. This actuation is detected by a control unit 8, which controls the central locking device and thereupon drives the transmitter 2 for transmitting, for example an inductive, interrogation code signal (search telegram). This interrogation code signal (also referred to as a question code signal) is received by all transponders present in the transmission range. The transponders are all configured such that they answer the same interrogation code signal immediately with their preferably coded answer signal. These simultaneously transmitted answer signals are received by the receiver 3 and evaluated by the control unit 8 or a separate evaluation circuit which, if appropriate in the case of different answer signals, can select and evaluate even only one of the these answer signals. In the case of a correct answer signal, that is to say an response code which corresponds to the expected code, the desired action is performed by the control unit 8, that is to say in this case the motor vehicle doors are unlocked. It is possible for the initialization of the authorization communication not only to be initiated by the access control system after the actuation of the pushbutton 7 or another component but also, as an alternative, to be started in cyclic or acyclic intervals by the automatic transmission of the interrogation code signal.

The transponders 4 to 6 may be designed identically and contain an internal synchronization device which, when the interrogation code signal is received, effects synchronization with that signal, in particular for the purpose of attaining phase synchronization. Since the synchronization is performed in parallel in all of the receiving transponders, the latter are synchronized with the same signal, with the result that these transponders also operate in a mutually synchronized manner. The transponders are designed in such a way that they not only use the received interrogation code signal for synchronization purposes, but also evaluate it to the effect of whether the signal involved is an expected signal requiring a response code signal. If this is the case, all of the transponders transmit their response code signal (also referred to as an answer signal) in a synchronized manner, for example after a fixed time interval, which is the same for all of the transponders, starting from the reception of the interrogation code signal, with the result that these answer signals arrive at the receiver 3 at exactly the same time (disregarding the in practice insignificant delay differences possibly present due to distance differences). On account of their identical design, all of the transponders transmit the same answer signal with the same frequency and baud rate, with the result that, on account of the synchronization, no signal collision occurs at the receiver 3.

As an alternative or in addition to this synchronization of the transponders, it may also be provided that each transponder is assigned a dedicated characteristic frequency or other identifier which enables the central transmitting and receiving station to distinguish the transponders from one another in spite of simultaneous signal reception. To that end, in addition to the carrier frequency of usually 433 MHz which is common to all of the transponders, and the baud rate-dependent modulation—which is likewise the same for all of the transponders—of said carrier frequency (customary baud rates are 1 KBd to 10 KBd), it is possible to provide a further subcarrier for each transponder of 100 kHz, for example.

FIG. 2 shows the internal structure of a transponder, which, in this respect, may be the same for all of the transponders belonging to the system. A subcarrier frequency generator 10 generates a subcarrier frequency signal having a frequency of e.g. 100 kHz, which is applied to a modulator 12 (amplitude or frequency modulator). The modulator 12 modulates the subcarrier frequency signal with a code signal which is generated by a code generator 11 and has a specific baud rate. The output signal of the modulator 12 is applied to a second modulator 14, which modulates said signal with the actual carrier frequency of e.g. 433 MHz, which is generated by a carrier frequency signal generator 13. The output signal of the modulator 14 is radiated via a non-illustrated antenna to the receiver 3 (FIG. 1) of the transmitting and receiving station. Since there are a plurality of transponders (for example up to 8 transponders in the case of a motor vehicle), each transponder 4 to 6 is assigned a dedicated subcarrier, for example with a 100 kHz spacing. By way of example, the transponder 4 then has a subcarrier frequency of 100 kHz, the transponder 5 a subcarrier frequency of 200 kHz and the transponder 6 a subcarrier frequency of 300 kHZ, etc. However, the baud rate and the (main) carrier frequency are the same for all of the transponders 4 to 6. After the interrogation code signal, all transponders present in the reception range answer essentially simultaneously, in which case synchronization need not necessarily be provided. Each transponder answers with its dedicated output signal containing the frequency components which are defined by the subcarrier and are characteristic of the respective transponder (dedicated intermediate frequency). The receiver 3 and/or the control unit 8 can divide these simultaneously received answer signals between different channels, for example by means of suitable frequency filters, and evaluate them there. The receiver 3 or the control unit 8 is designed in such a way that it then selects the information received on all of the channels or only some channels, or else only on one channel, with regard to a correct response code and, in the case of a correct response code, triggers the associated function, for example unlocks the motor vehicle. In this case, it is also possible to assign a dedicated functional scope to each transponder, or at least to individual transponders, in which case the control unit 8, upon identifying the transponder currently present, enables only the functional scope assigned to said transponder, e.g. only door unlocking, but not engine starting.

The functional monitoring system may, if appropriate, also contain a plurality of transmitting and receiving stations for each object to be controlled, in order for example to transmit in different directions and to be able to receive well from different directions.

The functional monitoring system according to the invention may be not only a motor vehicle access control system but generally any desired system which enables specific actions or performs functions when an authorized transponder is present in the detection range of the system. The access control system may also be designed as an immobilizer control system which enables the motor vehicle to be started only when an authorized transponder is present. The functional monitoring system may also be an access control system for a or in a house, in which one or more doors, in particular entrance doors, can be opened only when an authorized transponder is concomitantly carried, or an access control system for an automatic teller machine from which cash can be removed only when an authorized transponder is located in the near range around the machine. In this case, the central transmitting and receiving station is respectively fitted in the region of the object that is to be controlled with regard to its function, together with a control device which performs the signal evaluation and functional control.

The transponders may be configured as desired and be designed for example as smart card, key, key ring pendant or body implant, provided that it is ensured that they can receive and transmit signals. To that end, each transponder may have an inductive receiver and a radio frequency transmitter, or be configured as a transmitter/receiver unit operating inductively or bidirectionally in the RF range. The signal transmission may also be effected via infrared paths.

Authorized transponders are to be understood here to be transponders which belong to the relevant functional monitoring system. In the case of a motor vehicle, the assignment of the transponders may be effected e.g. at the end of the production line or in a workshop.

The detection range of the access control system in this case corresponds to that region in and around the system in which the central transmitting and receiving station can communicate with the transponders and receive signals therefrom. The interrogation code signal generally represents a bit pattern, that is to say a signal consisting of a bit sequence, which is transmitted by means of the transmitter 2, for example an inductive transmission antenna, and received and evaluated by the transponders which are present in its transmission range.

We claim:

1. A motor vehicle access control system, comprising:
   a transmitting/receiving station configured for mounting in or on a motor vehicle;
   first and second transponders each disposed and configured to receive an interrogation code signal from said transmitting/receiving station and, upon receipt of said interrogation code signal, to transmit a coded answer signal;
   each of said transponders having:
      a carrier frequency generator disposed and configured to generate a carrier frequency, and a sub-carrier frequency generator disposed and configured to generate a sub-carrier frequency;
      a first modulator disposed and configured to modulate the sub-carrier frequency with a response code signal that includes a transponder identification code and an instruction, thereby generating a modulated output signal;

a second modulator disposed and configured to modulate the carrier frequency with the modulated output signal, thereby generating the coded answer signal; and an antenna disposed and configured to transmit the coded answer signal;

wherein said sub-carrier frequency generator of said first transponder generates a first sub-carrier frequency, said sub-carrier frequency generator of said second transponder generates a second-carrier frequency different from the first sub-carrier frequency, said first and second transponders utilize a common carrier frequency, and a transponder identification code of said first transponder is different from the transponder identification code of said second transponder; and said transmitting/receiving station is disposed and configured to substantially simultaneously receive and de-modulate the respective coded answer signals and to trigger an access authorization when a matching response code signal has been identified.

2. The system according to claim 1, wherein said transmitting/receiving station is disposed and configured to divide the received coded answer signals between different frequency channels and to evaluate the respective received coded answer signals substantially in parallel.

3. A method for accessing a motor vehicle, comprising:

transmitting an interrogation code signal from a transmitting/receiving station associated with the motor vehicle;

receiving and processing the interrogation code signal in at least a first and a second transponder and generating a response code signal including an identification code signal and an instruction, wherein the identification code signal of the first transponder is different from the identification code signal of the second transponder;

modulating a sub-carrier frequency with the response code signal, thereby generating a first modulated output signal, wherein the first transponder modulates its response code signal with a sub-carrier frequency that is different from the sub-carrier frequency with which the second transponder modulates its response code signal;

modulating a carrier frequency with the first modulated output signal, thereby generating a coded answer signal, and thereby utilizing a same carrier frequency with the first and second transponders;

substantially simultaneously transmitting the respective coded answer signals from at least the first and second transponders;

substantially simultaneously receiving and demodulating the respective coded answer signals at the transmitting/receiving stations; and triggering an access authorization for the motor vehicle upon identification of a matching response code signal from at least one of the first and second transponders.

4. The method according to claim 3, wherein the triggering step comprises unlocking a vehicle door of the motor vehicle.

5. The method according to claim 3, wherein the triggering step comprises enabling a vehicle engine of the motor vehicle to be started.

6. A motor vehicle access system, comprising:

at least a first and a second transponder, each transponder including:

means for receiving and processing an interrogation code signal and means for generating a response code signal including an identification code signal and an instruction, wherein the identification code signal of the first transponder is different from the identification code signal of the second transponder;

means for modulating a sub-carrier frequency with the response code signal, thereby generating a first modulated output signal, wherein the first transponder is disposed and configured to modulate its response code signal with a sub-carrier frequency that is different from the sub-carrier frequency that the second transponder is disposed and configured to modulate its response code signal;

means for modulating a carrier frequency with the first modulated output signal, thereby generating a coded answer signal, wherein the first and second transponders utilize the same carrier frequency; and means for transmitting the respective coded answer signals; and a transmitting/receiving station associated with the motor vehicle, the transmitting/receiving station including:

means for transmitting the interrogation code signal; and means for receiving and demodulating the respective coded answer signals; and means for triggering an access authorization for the motor vehicle upon identifying a matching response code signal from at least one of the first and second transponders.

7. The method according to claim 6, further comprising means for unlocking a vehicle door upon triggering of the access authorization.

8. The method according to claim 6, further comprising means for enabling a vehicle engine to be started upon triggering of the access authorization.

* * * * *